(12) United States Patent
Helms (10) Patent No.: US 7,716,702 B2
(45) Date of Patent: May 11, 2010

(54) TECHNIQUE FOR DELIVERING VIA A COMMUNICATIONS NETWORK DATA FOR IMAGE DISPLAY WITH A DESIRED ASPECT RATIO

(75) Inventor: William Helms, Longmont, CO (US)

(73) Assignee: Time Warner Cable, Inc., New York, NY (US)

( * ) Notice: Subject to any disclaimer, the term of this patent is extended or adjusted under 35 U.S.C. 154(b) by 990 days.

(21) Appl. No.: 10/865,472

(22) Filed: Jun. 10, 2004

(65) Prior Publication Data

US 2005/0278740 A1 Dec. 15, 2005

(51) Int. Cl.
*G06F 13/00* (2006.01)
*G06F 3/00* (2006.01)
*H04N 7/16* (2006.01)

(52) U.S. Cl. ............... 725/41; 725/39; 725/42; 725/44; 725/47; 725/80; 725/131; 725/139; 348/441; 348/556; 348/558; 348/581; 345/699

(58) Field of Classification Search ............... 725/41, 725/39, 47; 348/441, 556
See application file for complete search history.

(56) References Cited

U.S. PATENT DOCUMENTS

| | | | |
|---|---|---|---|
| RE38,079 E * | 4/2003 | Washino et al. ............. 348/722 |
| 6,681,395 B1 * | 1/2004 | Nishi ........................... 725/45 |
| 6,839,903 B1 * | 1/2005 | Shintani et al. ............... 725/39 |
| 7,106,383 B2 * | 9/2006 | Kahn ........................... 348/556 |
| 2002/0036710 A1 * | 3/2002 | Choi ............................ 348/564 |
| 2004/0107439 A1 * | 6/2004 | Hassell et al. ................. 725/44 |
| 2004/0130664 A1 * | 7/2004 | Stessen ........................ 348/576 |
| 2004/0212731 A1 * | 10/2004 | Sie et al. ...................... 348/445 |
| 2004/0268413 A1 * | 12/2004 | Reid et al. ................... 725/131 |
| 2005/0030386 A1 * | 2/2005 | Kamieniecki ............. 348/211.3 |

* cited by examiner

*Primary Examiner*—Joseph P. Hirl
*Assistant Examiner*—Jun Fei Zhong
(74) *Attorney, Agent, or Firm*—The Marbury Law Group PLLC (57) ABSTRACT

A system and method are provided for delivering data including graphical components to user terminals through a communications network, e.g., a cable TV network. In one embodiment, multiple versions of a graphical component of a program guide, each formatted for a respective aspect ratio of a user's TV, are generated. On the other hand, a single version of non-graphical program guide data may also be generated. A data stream containing the non-graphical data and the multiple versions of the graphical component is transmitted to set-top terminals in the network via a transmission channel. If a graphical component is desired, the set-top terminal retrieves from the data stream a selected version of the graphical component that is compatible with the aspect ratio of the TV to which it is connected.

36 Claims, 5 Drawing Sheets

| 407 | CATALOG TYPE |
|---|---|
| 409 | CATALOG ID |
| 411 | CATALOG VERSION |
| 413 | NUMRECORDS |

| 507 | CATALOG TYPE |
|---|---|
| 509 | CATALOG ID |
| 511 | CATALOG VERSION |
| 512 | ASPECT RATIO |
| 513 | NUMRECORDS |

TECHNIQUE FOR DELIVERING VIA A COMMUNICATIONS NETWORK DATA FOR IMAGE DISPLAY WITH A DESIRED ASPECT RATIO

FIELD OF THE INVENTION

The invention relates to communications systems and methods, and more particularly to a system and method for providing image data through a communications network, e.g., a cable television network.

BACKGROUND OF THE INVENTION

As digital television technology becomes more readily available to an increasing number of consumers, many cable operators have made efforts to offer programming content formatted according to digital television standards. However, these cable operators face a mixture of competing demands—while an increasing number of users have televisions capable of displaying pictures based on high definition television (HDTV) standards, other users have televisions that display pictures based on the older, standard definition television (SDTV) standard.

The standards developed by the Advanced Television Systems Committee (ATSC), which include digital HDTV and SDTV, specify technologies for the transport, format, compression, and transmission of digital television in the United States. HDTV provides a very high quality display, with a vertical resolution display from 720p to 1080i and higher, and an aspect ratio (the width to height ratio of the screen) of 16:9. For example, one common HDTV format specifies a display having 1920×1080 pixels. SDTV has a range of lower resolutions and commonly provides a 4:3 aspect ratio. For example, one common SDTV format specifies a display having 640×480 pixels. The ratios "4:3" and "16:9" are used herein as adjectives to describe an image, such as an icon, a video frame, or a group of pixels, that is formatted for a respective aspect ratio. For example, an icon defined for a 4:3 aspect ratio is referred to as a "4:3 icon."

In a typical cable television network, a digital television signal transmitted from a cable operator's headend is received and processed at a user's home by a set-top terminal. A set-top terminal receives, from the cable network, encoded signals containing programming content and other data, decodes the signals, and converts them into signals displayable by the television. A set-top terminal also accepts commands from the user relating to the user's choices for programming and services.

Several techniques exist for displaying a 4:3 image on an HDTV display. One common reformatting technique defines a 4:3 frame in the middle of the television screen, leaving bars of unused space on both sides. The resulting display is unsatisfactory from a technical standpoint because it does not fully utilize the television screen. Additionally, some viewers find the appearance of the bars on the screen to be aesthetically displeasing.

A second approach applies image processing techniques to "stretch" a 4:3 image to create a 16:9 image. This may be achieved, for example, by upsampling the 4:3 image data. The resulting image fills the television screen; however, the "stretched" image may appear distorted. Because each pixel in the 4:3 image is defined to appear square when displayed on a 4:3 screen, "stretching" such a pixel for a 16:9 screen causes the pixel to appear rectangular or another shape. As a result, the reformatted image as a whole may appear distorted. For example, circular objects may appear elliptical in the 16:9 image.

A third approach used by some cable operators is to broadcast two versions of a given program to set-top terminals in the cable network. According to this method, a first signal is formatted for a 4:3 display and is transmitted via a carrier on a first transmission channel; a second signal is formatted for a 16:9 display and is transmitted via a carrier on a second transmission channel. Some existing set-top terminals have the capability to determine the aspect ratio of a television set and, in response, tune to the appropriate transmission channel to receive the signal, corresponding to the display characteristics of the television. This technique has the disadvantage of doubling the required amount of transmission bandwidth.

The conflicting HDTV and SDTV formats affect not only the programming content offered by cable operators, but also any other material of a graphical nature that is provided to users. For example, in addition to programming content, many cable operators provide program guide data to the set-top terminals in the network from time to time. Program guide data may be used, for example, in an interactive program guide ("IPG") application to provide to users information concerning available programs. Program guide data typically contains time and channel information concerning each program to be broadcast within a predetermined period. After receiving the program guide data from the cable network, a set-top terminal stores it in memory. This stored data is updated from time to time to provide the latest program guide information.

In addition to time and channel information, program guide data often includes data pertaining to one or more graphical images such as video clips, individual video frames, icons, etc. Such graphical images may be used, for example, in a graphical user interface for presenting the time and channel information to the user. A data file, or a set of data files, within the program guide data that represents a single graphical image or a set of related graphical images is referred to as a "graphical component." Thus, a graphical component may comprise, for example, data representing a single video frame, a series of video frames, or an icon.

SUMMARY OF THE INVENTION

Delivering graphical components for use in a cable system application, e.g., a program guide application, poses challenges for cable operators. When providing graphical components to set-top terminals connected to a communications network, cable operators have to address the conflicting needs of those users who have 4:3 television displays as well as those who have 16:9 television displays. Cable operators in many existing cable networks fail to fully address the problem and simply provide a single version of each graphical component, formatted for a 4:3 display, to all set-top terminals in the network. This solution is unsatisfactory because, as discussed above, an image formatted for a 4:3 display often appears distorted when displayed on a 16:9 television.

The invention overcomes the prior art limitations by delivering multiple versions of a graphical component through the communications network. In accordance with the invention, multiple versions of a graphical component, each formatted for a respective aspect ratio of a display device associated with a user terminal, are generated. A transmission channel in the communications network is assigned to transport the multiple versions of the graphical component. Also provided is information concerning the aspect ratios associated with the respective versions of the graphical component, thereby facilitating selecting by the user terminal one of the multiple versions of the graphical image corresponding to the aspect ratio of the display device associated with the user terminal. The selected version of the graphical component may be stored in memory and subsequently retrieved by the user terminal when it is needed to display the graphical image. The user terminal may additionally convert a selected version of a graphical component, which is formatted for a display having a first pixel resolution, to a format suitable for a display having a second pixel resolution.

BRIEF DESCRIPTION OF THE DRAWINGS

Further objects, features and advantages of the invention will become apparent from the following detailed description taken in conjunction with the accompanying drawing showing illustrative embodiments of the invention, in which.

DETAILED DESCRIPTION

The invention is directed to a technique for delivering data pertaining to a graphical image to users in a communications network. In particular, a system and method are provided for delivering program guide data, including one or more data files representing a graphical image (such data files collectively being referred to as a "graphical component"), to set-top terminals in a cable network.

In accordance with a first feature of the invention, multiple data files containing program guide data are delivered to one or more set-top terminals in a communications network. Multiple versions of a graphical component, each formatted for a respective aspect ratio, are generated. One or more non-graphical data files containing non-graphical program guide data may also be generated. A data stream containing the multiple versions of the graphical component, and the non-graphical data files, is transmitted to set-top terminals in the network via a predetermined transmission channel.

In accordance with a second feature of the invention, one or more data files containing program guide data, including one or more graphical components, are selectively retrieved from a predetermined transmission channel. A set-top terminal determines the aspect ratio of the display device connected thereto by, e.g., querying the display device or, alternatively, by consulting predetermined user configuration parameters. If a graphical component is desired, the set-top terminal selects, from multiple versions of the graphical component provided by the predetermined channel, the version that is compatible with the aspect ratio of the display device. The set-top terminal then stores the selected data files, including the proper aspect-ratio versions of graphical components, in memory.

In one embodiment, graphical components are used to construct graphical user interfaces ("GUIs") for interactive program guides ("IPGs"). IPG applications are used increasingly in cable networks to provide to users information concerning available programs. Multiple methodologies are used for providing guide data to a set-top terminal to realize an IPG, and use of a particular methodology depends on how likely the programs associated with the guide data are of interest to the user. An example of such a particular methodology is described in copending, commonly assigned U.S. application Ser. No. 10/390,963, filed on Mar. 18, 2003, hereby incorporated by reference in its entirety. For example, a user may be more interested in learning about the broadcast programs of the current day and the day after than any other time. The user may also be likely interested in learning about the programs broadcast on the previous day, and perhaps for some reason missed their broadcast, but would like to review them. In general, the user's interest in learning about a program is inversely proportional to the time between its broadcast and the current time. That is, the longer the time between its broadcast and the current time is, the less the user interested in learning about the program. By taking advantage of this observation, in one embodiment the guide data concerning the broadcast programs on, e.g., the current day and the day before and after, is provided automatically to a set-top terminal. The remaining guide data, however, may be provided to a set-top terminal on an as needed basis. That is, the set-top terminal may need to issue a request for such guide data when a user tries to access it on the IPG, thus requiring two-way communications, i.e., a terminal request in an upstream direction and a network response with the requested guide data in a downstream direction.

Figure 1:
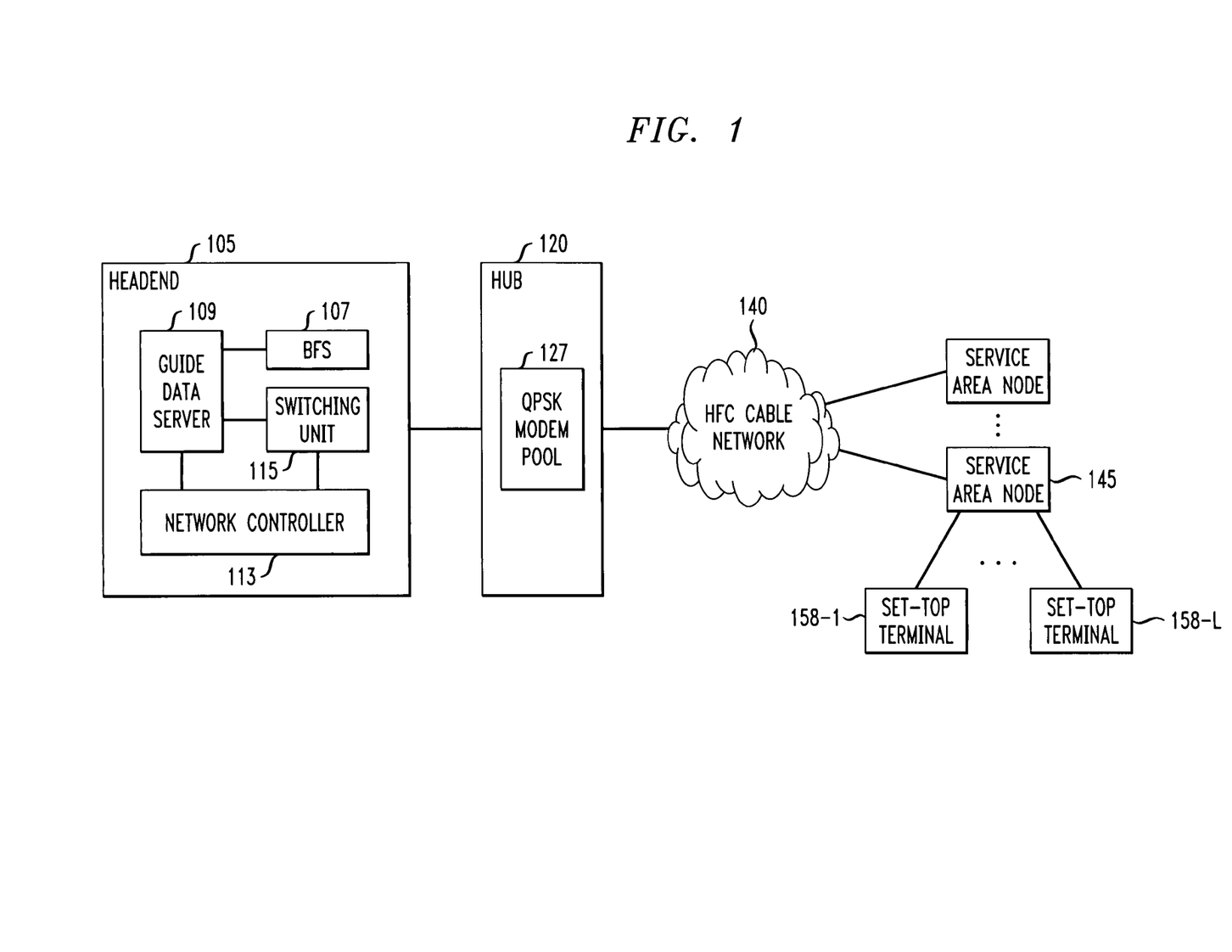
FIG. 1 illustrates a portion of a broadband communications system in which program guide and related data is provided to set-top terminals in accordance with the invention.

FIG. 1 illustrates a portion of a broadband communications system, e.g., a cable system, embodying the principles of the invention which is relevant to communication of guide data from headend 105 to set-top terminals at the user premises. As shown in FIG. 1, the broadband communications system includes headend 105, hub 120, hybrid fiber coaxial (HFC) cable network 140, and service area node 145 which is connected to set-top terminals 158-1 through 158-L in a neighborhood, where L is a predetermined number. Headend 105 includes guide data server 109, broadcast file system (BFS) 107, switching unit 115, and network controller 113.

Figure 2:
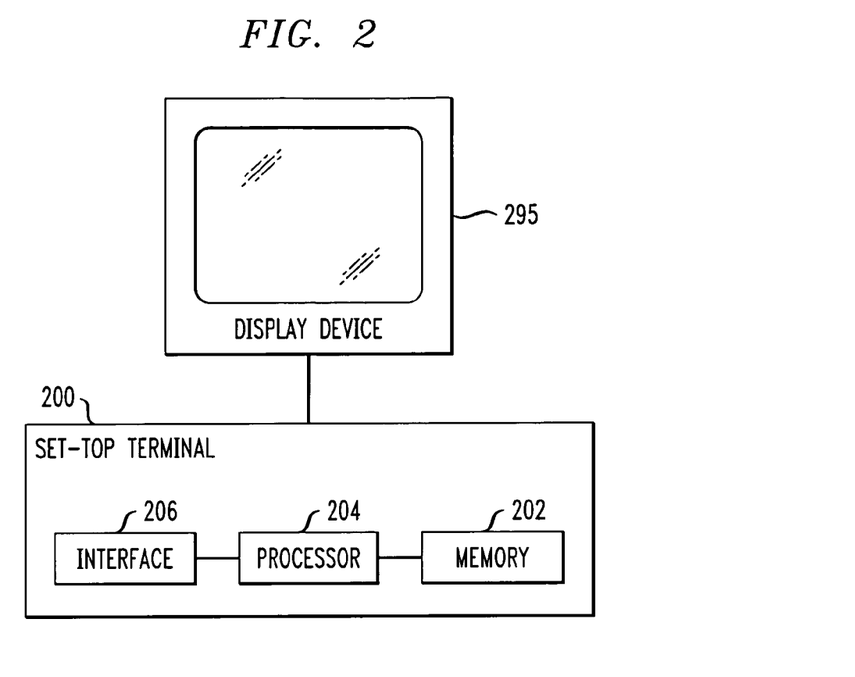
FIG. 2 is a block diagram of a set-top terminal and a display device.

FIG. 2 illustrates set-top terminal 200 and display device 295. Display device 295 may be, e.g., a television. Set-top terminal 200 generically represents one of set-top terminals 158-1 through 158-L. As shown in FIG. 2, set-top terminal 200 comprises memory 202 which includes a cache (not shown), and processor 204 for orchestrating operations of set-top terminal 200, including, e.g., updating guide data stored in memory 202, and initiating requests for guide data which is not available in memory 202, in accordance with the invention. Interface 206 includes a cable modem (not shown) capable of receiving data from, and transmitting data to, network 140. Interface 206 also performs any well-known modulation, demodulation or formatting that is necessary to transmit or receive programming content and data.

Set-top terminal 200 receives signals containing programming material and other data from network 140, and, if necessary, may reformat the signals prior to transmitting them to display device 295. In one embodiment, display device 295 may be, e.g., a high definition television with a display having a 16:9 aspect ratio. In another embodiment, display device 295 may be a television with a display having a 4:3 aspect ratio.

In this instance, programming content including the content of broadcast programs and video-on-demand (VOD) programs are provided from headend 105 to set-top terminals through transmission channels. These transmission channels may be 6 MHz bands populating a forward passband, e.g., 350-750 MHz band, of a coaxial cable, which is allocated for downstream communication from headend 105 to a set-top terminal. It should be noted at this point that the term "transmission channel" should not be confused with a "program channel." A "transmission channel" signifies a designated frequency band through which a transport stream containing broadcast programs is transmitted. On the other hand, a "program channel" signifies the source of the program material selected by a user to view. For example, a user may select program channel 2 to view program material provided by CBS, program channel 14 to view program material provided by ESPN; program channel 32 to view program material provided by MTV, etc.

Upstream data from a set-top terminal to headend 105 may be communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 113 are identified by the Internet protocol (IP) addresses assigned thereto. However, these IP addresses may be randomly assigned each time when the broadband communication system is reconfigured. As a result, the IP address of a set-top terminal or controller 113 may change after a system reconfiguration. Nevertheless, each of set-top terminals and controller 113 is also assigned a media access control (MAC) address on a permanent basis, surviving any system reconfiguration.

Downstream data from headend 105 to a set-top terminal may be communicated via forward data channels (FDCs). These channels, often referred to as "out-of-band" channels, may occupy the 70-130 MHz band of a coaxial cable. For example, QPSK signals containing system messages to a set-top terminal are transmitted through an FDC having a 1 MHz bandwidth. It should be noted that the 1 MHz bandwidth allocated for an FDC here is for illustrative purposes only.

In accordance with one embodiment, a subset of the program guide data from guide data server 109, especially those which are likely accessed by a user, is broadcast to set-top terminals using a data carousel (BFS 107) of conventional design. BFS 107 in this instance allows a set-top terminal to read guide data related files or catalogs from a broadcast stream as if they were local catalogs. The broadcast stream is modulated using a designated QPSK modem in pool 127 onto an out-of-band channel. In general, BFS 107 is used to "trickle," or disseminate piecemeal, guide data related catalogs to set-top terminals, which then assemble the guide data to build their own cache for an IPG. To that end, BFS 107 applies a well known "data carousel" mechanism for periodically providing catalogs onto the broadcast stream to the set-top terminals. Depending on the capacity of its cache, each set-top terminal may be programmed differently to read from the broadcast stream some or all of the catalogs in the broadcast stream and store an amount of guide data corresponding to its cache capacity. In one embodiment, the priority in reading particular catalogs is given to those catalogs containing guide data associated with programs which are more likely of interest to a user.

In accordance with one embodiment, a profile is provided by BFS 107 in the broadcast stream which each set-top terminal is required to read initially in each period. The profile, also referred to as a "genesis" catalog, may be used by a set-top terminal to reconcile its guide data with server 109.

Figure 3:
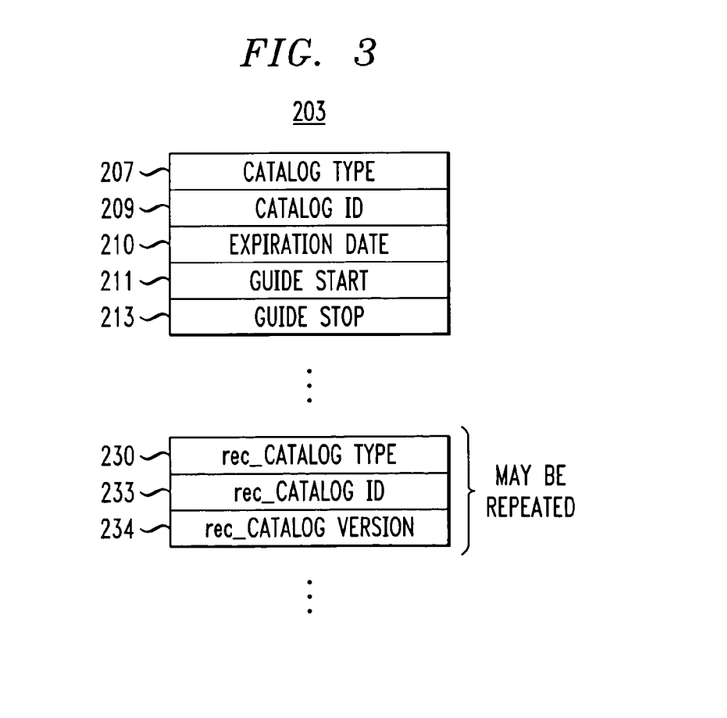
FIG. 3 illustrates a data structure of a profile used by the set-top terminal for receiving program guide data.

In addition, the profile may be used by a set-top terminal to determine the time-windows (also referred to as "carousel windows") of guide data available in the broadcast stream, and to locate desired catalogs within the respective time-windows in the broadcast stream. FIG. 3 illustrates the data structure of a profile, denoted 203. As shown in FIG. 3, profile 203 includes, e.g., Catalog Type field 207 which contains an identifier indicating that the instant catalog is of profile type; Catalog ID field 209 which, together with Catalog Type field 207, uniquely identifies the instant profile in the system; Expiration Date field 210 which specifies the time when the instant profile is no longer valid, or when a set-top terminal should read a new profile; Guide Start field 211 which specifies the start time of a total guide data window; and Guide Stop field 213 which specifies the end time of the total guide data window.

Profile 203 also lists all other catalogs that are available and their current version numbers, thereby allowing set-top terminal 200 to determine any outdated catalogs which need to be replaced by their current versions in memory 202. Thus, for each of such catalogs, profile 203 also includes, e.g., rec_Catalog Type field 230 which specifies the type of the catalog, rec_Catalog ID field 233 which, together with rec_Catalog Type field 230, uniquely identifies the catalog; and rec_Catalog Version field 234 which specifies the current version number of the catalog. Thus, by parsing profile 203, processor 204 in set-top terminal 200 can determine which catalogs are outdated, thereby allowing the terminal to replace those outdated catalogs with their current versions.

Figure 4:
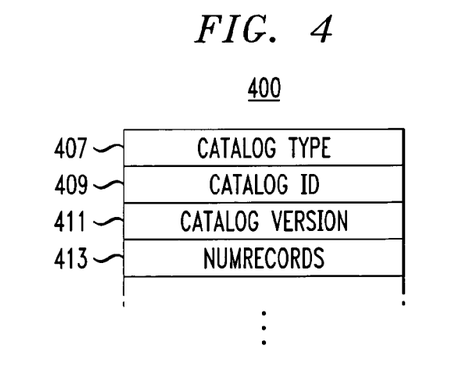
FIG. 4 illustrates a data structure of a catalog that may be utilized to transmit non-graphical data.

In an illustrative embodiment, program guide data that is graphical in nature (i.e., pertaining to graphical images such as icons, video frames, etc.) is treated differently from program guide data that is non-graphical in nature. Specifically, a first catalog format may be utilized to broadcast program guide data that is non-graphical in nature, such as, e.g., time and channel information, text messages, etc. FIG. 4 illustrates the data structure of a generic catalog, denoted 400, that may be utilized to transmit non-graphical data. Catalog 400 includes, e.g., Catalog Type field 407 which contains an identifier characterizing the catalog's contents; Catalog ID field 409 which, together with Catalog Type field 407, uniquely identifies the instant catalog in the system; Catalog Version field 411 which contains a version number of the instant catalog, which is incremented for each published change to the catalog; and NumRecords field 413 which contains the number of records or files which reside in the instant catalog. A catalog carrying non-graphical data is referred to as a "non-graphical catalog."

Figure 5:
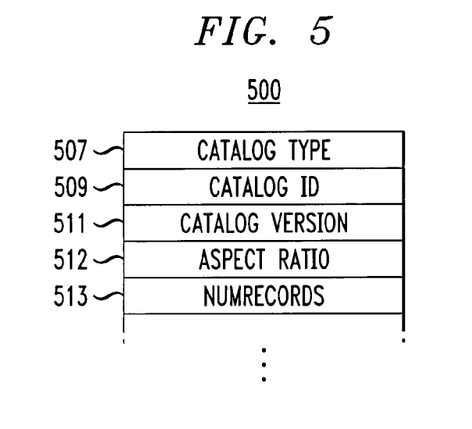
FIG. 5 illustrates a data structure of a catalog that may be utilized to transmit a graphical component.

In this embodiment, a second catalog format may be utilized to transmit data pertaining to one or more graphical components such as, e.g., a single video frame, a series of video frames, an icon, etc. FIG. 5 illustrates the data structure of a catalog, denoted 500, that may be utilized to transmit a graphical component. Catalog 500 includes, e.g., Catalog Type field 507 which contains an identifier characterizing the catalog's contents. Catalog 500 also comprises Catalog ID field 509 which, together with Catalog Type field 507, uniquely identifies the instant catalog in the system; and Catalog Version field 511 which contains a version number of the instant catalog, which is incremented for each published change to the catalog. Aspect Ratio field 512 indicates the aspect ratio for which the graphical component is formatted. For example, Aspect Ratio field may indicate "4:3." Num-Records field 513 contains the number of records or files which reside in the instant catalog. A catalog carrying data pertaining to a graphical component is referred to as a "graphical component catalog," or "GC catalog."

In accordance with a first feature of the invention, program guide data is transmitted to set-top terminals in a cable network via the BFS channel. A single version of non-graphical program guide data is generated and transmitted within one or more non-graphical catalogs. However, multiple versions of each graphical component are generated, and transmitted within one or more GC catalogs. For example, in one embodiment, a first version of a graphical component may be formatted for a 4:3 display (the "4:3 version"), and a second version may be formatted for a 16:9 display (the "16:9 version"). In this embodiment, one or more GC catalogs containing the 4:3 version, and one or more GC catalogs containing the 16:9 version, are broadcast to set-top terminals via the BFS broadcast stream.

Figure 6:
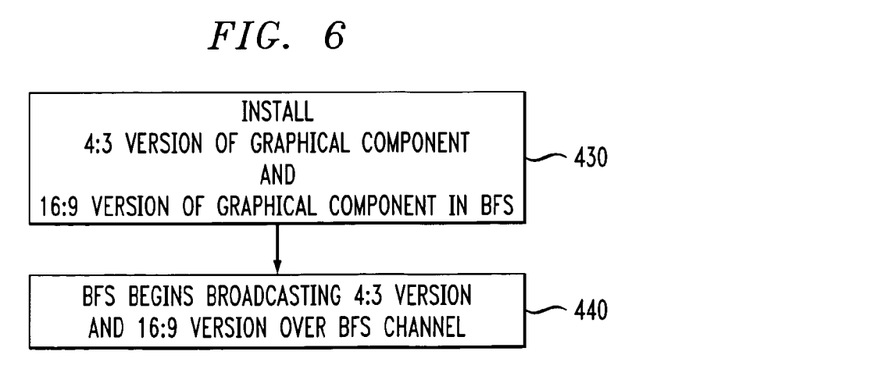
FIG. 6 is a flowchart depicting a routine for delivering program guide data to set-top terminals through a communications network.

FIG. 6 is a flowchart depicting a method for delivering program guide data including two versions of a graphical component to set-top terminals in a communications network, in accordance with the invention. At step 430, the cable operator installs in BFS 107 GC catalogs containing a 4:3 version of the graphical component, and a corresponding 16:9 version of the graphical component, respectively. In this illustrative embodiment, each version of the graphical component may be installed in BFS 107 within one or more GC catalogs. The cable operator may also install one or more non-graphical catalogs containing non-graphical data, in BFS 107. Profile 203 may be updated to reflect new versions of the catalog (s) in the BFS data stream. Referring to step 440, BFS 107 begins broadcasting the catalogs, including the GC catalogs containing the two versions of the graphical component, in cyclical fashion, over the BFS channel.

Figure 7:
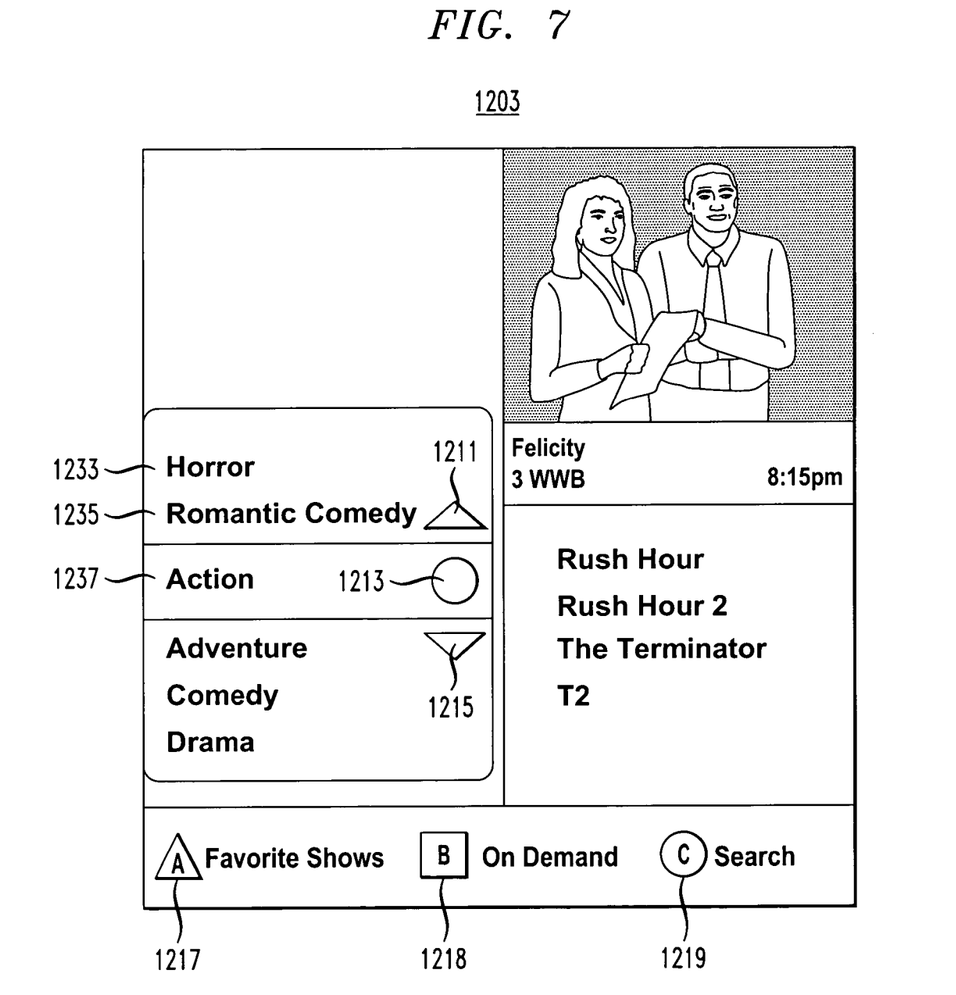
FIG. 7 illustrates a program guide menu.

In accordance with a second feature of the invention, a set-top terminal may selectively retrieve catalogs, including one or more graphical components, from the cable network, and utilize the catalogs to construct a graphical user interface for displaying program guide information. By way of illustration, FIG. 7 illustrates a program guide menu 1203 whose content is jointly contributed by one or more non-graphical data received in non-graphical catalogs, and by one or more graphical components received in GC catalogs. For example, the text of each selection in menu 1203, i.e., "Horror" 1233, "Romantic Comedy" 1235, "Action" 1237, etc., is derived from data in one or more non-graphical catalogs. Set-top terminal 200 may utilize the data to provide the text according to selections as to font type, font size, etc., desired by the user. On the other hand, icons 1217, 1218, and 1219, as well as indicators 1211, 1213, and 1215 are generated based on one or more graphical components derived from data in one or more GC catalogs.

Figure 8:
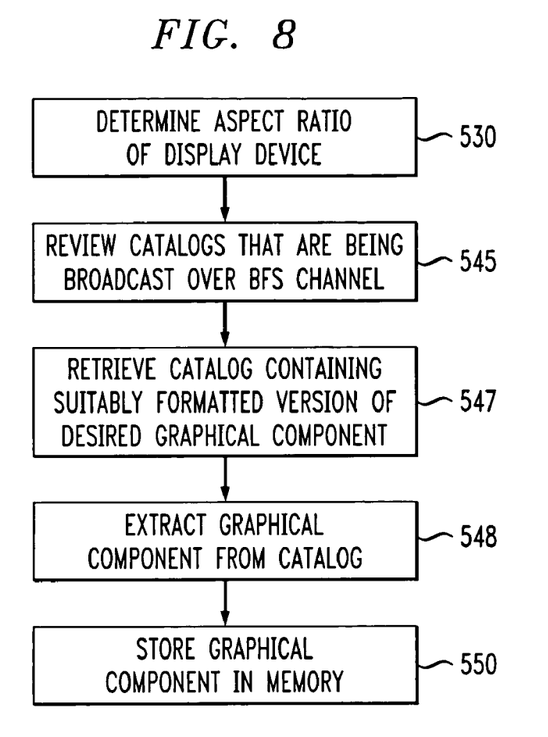
FIG. 8 is a flowchart depicting a routine for obtaining a graphical component catalog from a transmission channel in a communications network.

For illustrative purposes, suppose that set-top terminal 200 has read profile 203 and has determined that it needs to retrieve a particular GC catalog containing a desired graphical component. FIG. 8 is a flowchart depicting a method for retrieving a desired GC catalog from the BFS channel, according to one embodiment. At step 530, set-top terminal 200 in a well-known manner determines the aspect ratio of display device 295. In one embodiment, in which set-top terminal 200 is connected to display device 295 via a Digital Video Interface (DVI), set-top terminal 200 may utilize the DVI protocol to query display device 295, and receive a response specifying the format(s) that display device 295 supports. Alternatively, set-top terminal 200 may have prior knowledge of the display device's aspect ratio. For example, a preferred display aspect ratio may be established by the user a priori using configuration screens generated by set-top terminal 200. The routine proceeds from step 530 to step 545. At step 545, set-top terminal 200 tunes to the BFS channel and reviews the catalogs that are currently being broadcast. Because BFS 107 broadcasts data in cyclical fashion, it may be necessary for set-top terminal 200 to wait until the desired GC catalog appears within the BFS broadcast stream.

In one embodiment, set-top terminal 200 may read the Catalog Type field of each catalog that is broadcast, to determine whether the catalog is a GC catalog or a non-graphical catalog. Set-top terminal 200 may additionally examine the Catalog ID and Catalog Version fields of any GC catalog in an attempt to identify the desired graphical component. If set-top terminal 200 identifies a GC catalog containing the desired graphical component, set-top terminal may additionally read Aspect Ratio field 412 to determine whether the catalog contains a version of the graphical component formatted for the desired aspect ratio. After identifying a GC catalog containing a suitably formatted version of the desired graphical component, set-top terminal 200 retrieves the GC catalog from the BFS stream (step 547). At step 548, set-top terminal 200 extracts the graphical component data from the GC catalog, and, at step 550, stores it in memory 210.

In accordance with a third feature of the invention, set-top terminal 200 selects a desired version of a graphical component that is compatible with the aspect ratio of display device 295, and converts the selected version formatted for a particular resolution to a format suitable for the actual resolution of display device 295 different from that particular resolution. For example, first and second versions of a graphical component, corresponding to the respective 4:3 and 16:9 aspect ratios, are generated and transmitted via the BFS channel as described above. Suppose that display device 295 has a 16:9 aspect ratio. Set-top terminal 200 accordingly selects the second version and stores it in memory 202.

Figure 9:
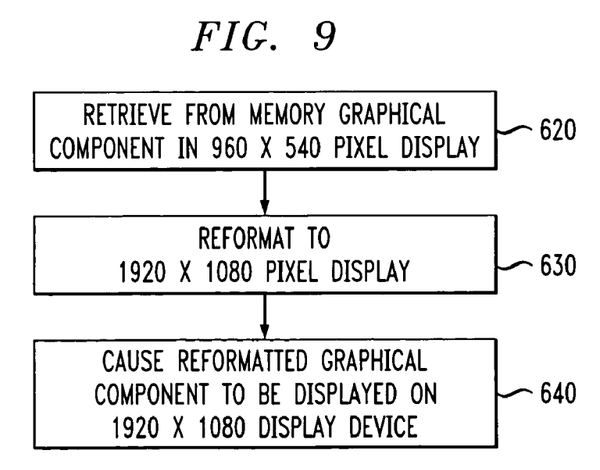
FIG. 9 is a flowchart depicting a routine for reformatting and displaying a graphical component.

Suppose further that the 16:9 version is formatted for a 960×540 pixel display, while display device 295 has a 1920× 1080 pixel display. FIG. 9 is a flowchart depicting a routine for reformatting and displaying the graphical component, in accordance with one embodiment. At step 620, set-top terminal 200 retrieves, from memory 210, the stored 16:9 version of the graphical component, which is formatted for a 960×540 display. At step 630, set-top terminal 200 reformats, e.g., by upsampling, the stored 16:9 version of the graphical component, creating an alternative 16:9 version formatted for a display having a 1920×1080 pixel resolution. At step 640, set-top terminal 200 causes the reformatted version of the graphical component to be displayed on display device 295.

Although in the example given above, a graphical component formatted for a 960×540 pixel display is reformatted for a 1920×1080 pixel display, the technique described above may be applied to convert any version of a graphical component formatted for a first pixel resolution to a format suitable for a second pixel resolution for the same aspect ratio. Using this technique allows a cable operator to reduce the bandwidth required for otherwise transmitting a higher resolution version of a graphical component. In the above example, less bandwidth is required to transmit, and less memory is required to store, a 960×540 pixel image than is needed for a 1920×1080 pixel image. Conversely, a graphical component formatted for a first, higher pixel resolution (e.g., 1920×1080) is made available to set-top terminal 200, which subsequently may convert the graphical component (e.g., by downsampling) to a format suitable for a second, lower pixel (e.g., 1280×720) display.

In other embodiments, multiple versions of non-graphical program guide data may be generated and transmitted within one or more non-graphical catalogs, via the BFS channel. For example, if a respective non-graphical program guide data pertains to a text message, several versions of the non-graphical program guide data, each representing the text message displayed with specified attributes (i.e., font type, font size, etc.), may be generated and transmitted. A set top terminal may subsequently select one or more non-graphical catalogs based on, e.g., preferred attributes selected by the user.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, the BFS broadcast stream carrying guide data related catalogs traverses an out-of-band channel. It will be appreciated that an inband channel may be used for transmission of such a broadcast stream as long as it does not interfere with delivery of programming content through the same inband channel to a set-top terminal.

In addition, data in the above-described catalogs is preferably compressed using a conventional data compression technique before its transmission to more efficiently utilize the limited network bandwidth.

Further, in the disclosed embodiment, a BFS data carousel mechanism is illustratively used to transport data catalogs to set-top terminals. However, it will be appreciated that a person skilled in the art may use other carousel mechanisms to achieve the similar function, which include, e.g., a well known OCAP object (data) carousel mechanism, DSM-CC object (data) carousel mechanism, MHP object (data) carousel mechanism, etc.

Finally, the broadband communications system of FIG. 1 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A system for delivering a graphical image file and non-graphical data to construct a program guide through a communications network comprising:
    a headend connected to the communications network and comprising instructions for generating a first record comprising a first version of the graphical image file formatted for a first aspect ratio and a second record comprising a second version of the graphical image file formatted for a second aspect ratio,
    wherein the graphical image file comprises at least one of a single video frame, a series of video frames, and an icon; and wherein the non-graphical data comprises at least one of time information, channel information, and text messages;
    a transmission channel in the communications network, wherein the transmission channel is assigned to transport both the first record and second record in a first data stream, and the non-graphical data in a second data stream to a user terminal connected to the communications network,
    a display device connected to the user terminal, wherein the display device is configured to display the graphical image file using an aspect ratio selected from the first and the second aspect ratios; and
    wherein the user terminal further comprises instructions for:
    selecting a record from the first and second records from the first data stream;
    storing the selected record;
    constructing the program guide based on the selected record of the graphical image file corresponding to the aspect ratio associated with the display device and the non-graphical data; and
    communicating to the display device the program guide.

2. The system of claim 1, wherein the first aspect ratio is 4:3.

3. The system of claim 1, wherein the second aspect ratio is 16:9.

4. The system of claim 1, wherein the communications network comprises a hybrid fiber coaxial (HFC) cable network.

5. The system of claim 1, wherein the transmission channel is configured for transmissions by a broadcast file system (BFS).

6. The system of claim 1, wherein the user terminal comprises a cable set-top terminal.

7. A user apparatus for receiving a graphical image file and non-graphical data to construct a program guide through a communications network:
    a display device connected to the user apparatus, wherein the display device is configured to use an aspect ratio selected from first and second aspect ratios;
    an interface for accessing a transmission channel in the communications network, wherein the transmission channel is assigned to transport a first record comprising a first version of the graphical image file formatted for the first aspect ratio and a second record comprising a second version of the graphical image file formatted for the second aspect ratio in a first data stream and the non-graphical data in a second data stream the user apparatus, wherein the graphical image comprises at least one of a single video frame, a series of video frames, and an icon and wherein the non-graphical data comprises at least one of time information, channel information, and text messages;
    a processor comprising instructions for:
    identifying an aspect ratio of the display device connected to the user apparatus;
    selecting a record from the first and second records from the first data stream;
    storing the selected record;
    constructing the program guide based on the selected record of the graphical image file corresponding to the aspect ratio associated with the display device and the non-graphical data; and
    communicating to the display device the program guide.

8. The user apparatus of claim 7, wherein the first aspect ratio is 4:3.

9. The user apparatus of claim 7, wherein the second aspect ratio is 16:9.

10. The user apparatus of claim 7, wherein the communications network comprises an HFC cable network.

11. The user apparatus of claim 7, wherein the transmission channel is configured for transmissions by a BFS.

12. The user apparatus of claim 7, wherein the version of the graphical image in the selected record comprises a first resolution and wherein the instruction for communicating to the display device the program guide further comprises instructions for:
 acquiring the version of the graphical image file in the selected record;
 modifying the graphical image file to generate a graphical image having a second resolution that is different from the first; and
 constructing the program guide based on the graphical image having the second resolution.

13. The user apparatus of claim 12, wherein the first resolution is higher than the second resolution.

14. The user apparatus of claim 13, wherein the first resolution is 1920×1080 pixels.

15. The user apparatus of claim 13, wherein the second resolution is 1280×720 pixels.

16. The user apparatus of claim 12, wherein the first resolution is lower than the second resolution.

17. The user apparatus of claim 16, wherein the first resolution is 960×540 pixels.

18. The user apparatus of claim 16, wherein the second resolution is 1920×1080 pixels.

19. A method for delivering a graphical image file and non-graphical data to construct a program guide through a communications network comprising:
 generating a first record comprising a first version of the graphical image file formatted for a first aspect ratio and a second record comprising a second version of the graphical image file formatted for a second aspect ratio,
 wherein the graphical image file comprises at least one of a single video frame, a series of video frames, and an icon; and wherein the non-graphical data comprises at least one of time information, channel information, and text messages:
 assigning a transmission channel in the communications network to transport the first record and second record;
 sending through the transmission channel a first data stream comprising the first record and the second record, and a second data stream comprising the non-graphical data to a user terminal;
 determining at the user terminal an aspect ratio of a display device connected to the user terminal;
 selecting a record from the first and second records from the first data stream;
 storing the selected record;
 constructing the program guide based on the selected record of the graphical image file corresponding to the aspect ratio associated with the display device and the non-graphical data; and
 communicating to the display device the program guide.

20. The method of claim 19, wherein the first aspect ratio is 4:3.

21. The method of claim 19, wherein the second aspect ratio is 16:9.

22. The method of claim 19, wherein the communications network comprises an HFC cable network.

23. The method of claim 19, wherein the transmission channel is configured for transmissions by a BFS.

24. The method of claim 19, wherein the user terminal comprises a cable set-top terminal.

25. A method for use in a user apparatus for receiving a graphical image file and non-graphical data to construct a program guide through a communications network comprising:
 identifying an aspect ratio of a display device associated with the user apparatus, wherein the display device is configured to use an aspect ratio selected from first and second aspect ratios;
 accessing a transmission channel in the communications network, the transmission channel transporting a plurality of records in a first data stream comprising at least a first record comprising a first version of the graphical image file formatted for the first aspect ratio and a second record comprising a second version of the graphical image file formatted for the second aspect ratio in a first data stream, and the non-graphical data in a second data stream to the apparatus;
 wherein the graphical image comprises at least one of a single video frame, a series of video frames, and an icon; and wherein the non-graphical data comprises at least one of time information, channel information, and text messages:
 selecting a record from the plurality of records;
 storing the selected record;
 constructing the program guide based on the selected record of the graphical image file corresponding to the aspect ratio associated with the display device and the non-graphical data; and
 communicating to the display device the program guide.

26. The method of claim 25, wherein the first aspect ratio is 4:3.

27. The method of claim 25, wherein the second aspect ratio is 16:9.

28. The method of claim 25, wherein the communications network comprises an HFC cable network.

29. The method of claim 25, wherein the transmission channel is configured for transmissions by a BFS.

30. The method of claim 25, wherein the version of the graphical image file in the selected record comprises a first resolution and wherein the instruction for communicating to the display device the program guide further comprises instructions for:
 acquiring the version of the graphical image files in the selected record;
 modifying the graphical image file to generate a graphical image having a second resolution that is different from the first; and
 constructing the program guide based on the graphical image having the second resolution.

31. The method of claim 30, wherein the first resolution is higher than the second resolution.

32. The method of claim 31, wherein the first resolution is 1920×1080 pixels.

33. The method of claim 31, wherein the second resolution is 1280×720 pixels.

34. The method of claim 30 wherein the first resolution is lower than the second resolution.

35. The method of claim 34, wherein the first resolution is 960×540 pixels.

36. The method of claim 34, wherein the second resolution is 1920×1080 pixels.

* * * * *